April 3, 1956  M. I. DORFAN  2,740,426
THROTTLING GATE VALVE
Filed Aug. 5, 1953  2 Sheets-Sheet 1

INVENTOR.
MORTON I. DORFAN
BY
Brown, Critchlow, Flick & Peckham
ATTORNEYS

April 3, 1956
M. I. DORFAN
2,740,426
THROTTLING GATE VALVE
Filed Aug. 5, 1953
2 Sheets-Sheet 2
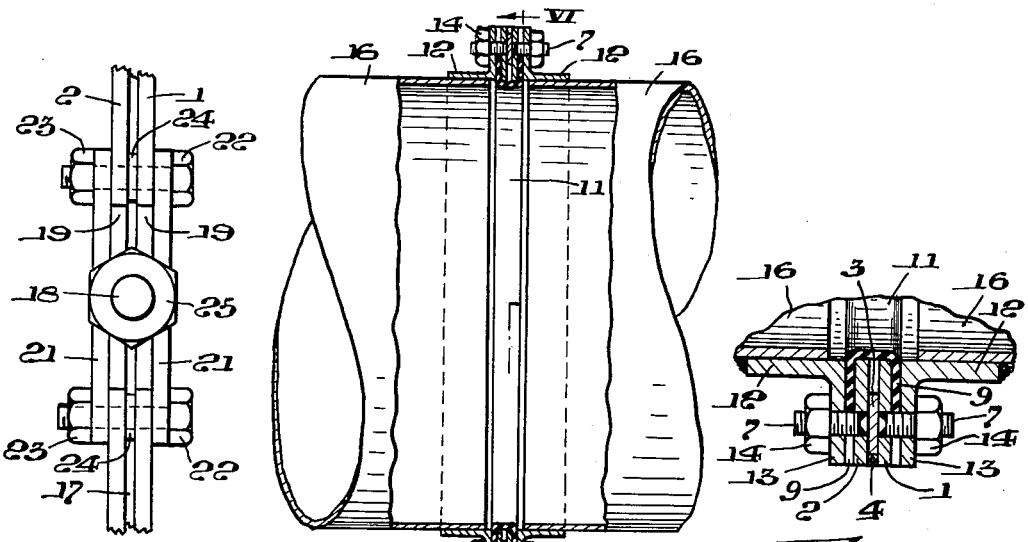
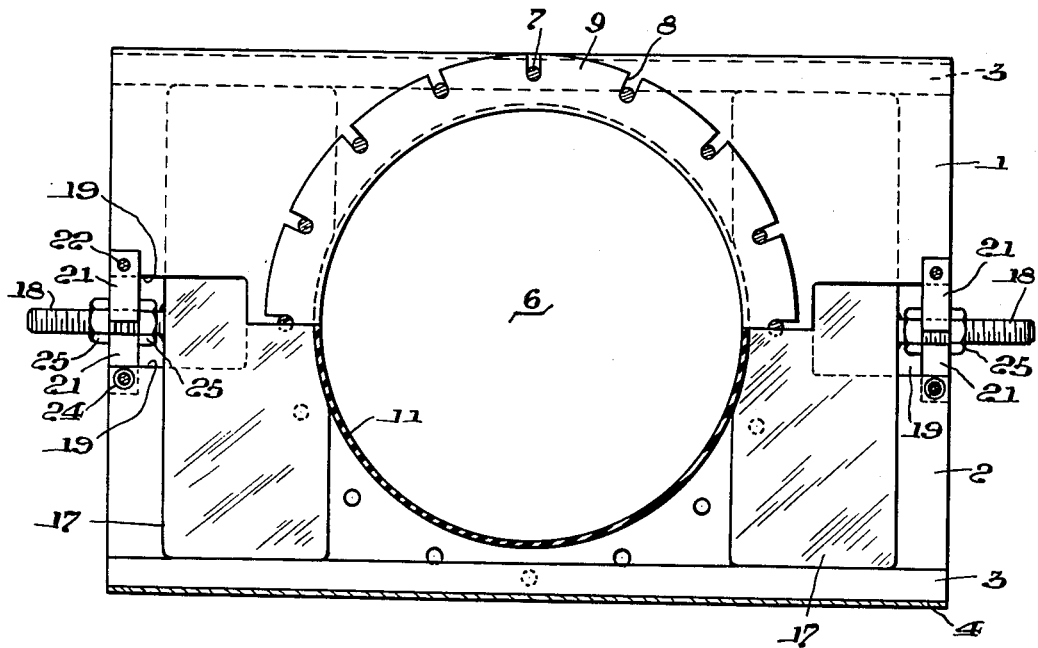
INVENTOR.
Morton I. Dorfan
BY
Brown, Critchlow, Flick & Peckham
ATTORNEYS

# United States Patent Office 2,740,426
Patented Apr. 3, 1956

2,740,426

THROTTLING GATE VALVE

Morton I. Dorfan, Pittsburgh, Pa., assignor to Mechanical Industries, Inc., Pittsburgh, Pa., a corporation of Pennsylvania Application August 5, 1953, Serial No. 372,489

4 Claims. (Cl. 138—45)

This invention relates to gate valves, and more particularly to those used only for throttling purposes.

It is among the objects of this invention to provide a throttling gate valve which is streamlined to some extent, which is protected from abrasion, which gives control over stratification of gases flowing through it, and which is simple and inexpensive in construction.

In accordance with this invention a valve frame is provided with an opening which forms a fluid passage through it. The opposite ends of the opening are connected with the pipes, between which the valve is mounted. On at least one side of the opening there is a gate which can be moved radially inward toward the center of the opening. When two gates are used they are movable independently of each other from opposite directions. A resilient ring is secured to the frame around the opening and extends across the inner edge of the gate, so that when the gate is moved inward it will stretch the portion of the ring beside it inward part way across the opening to reduce the size of the fluid passage. The ring preferably is U-shape in cross section, with flanges extending outward on opposite sides of the gate. These flanges can be clamped against the frame by rings that are connected to the pipes which the valve connects. Such a ring seals the wall of the valve opening.

Figure 1:
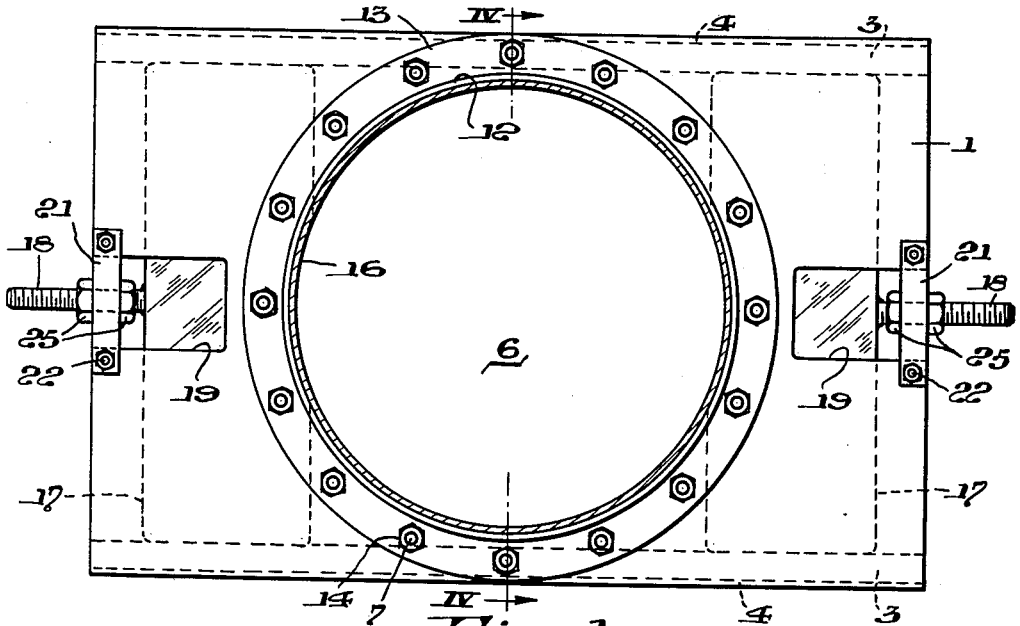
Figure 2:
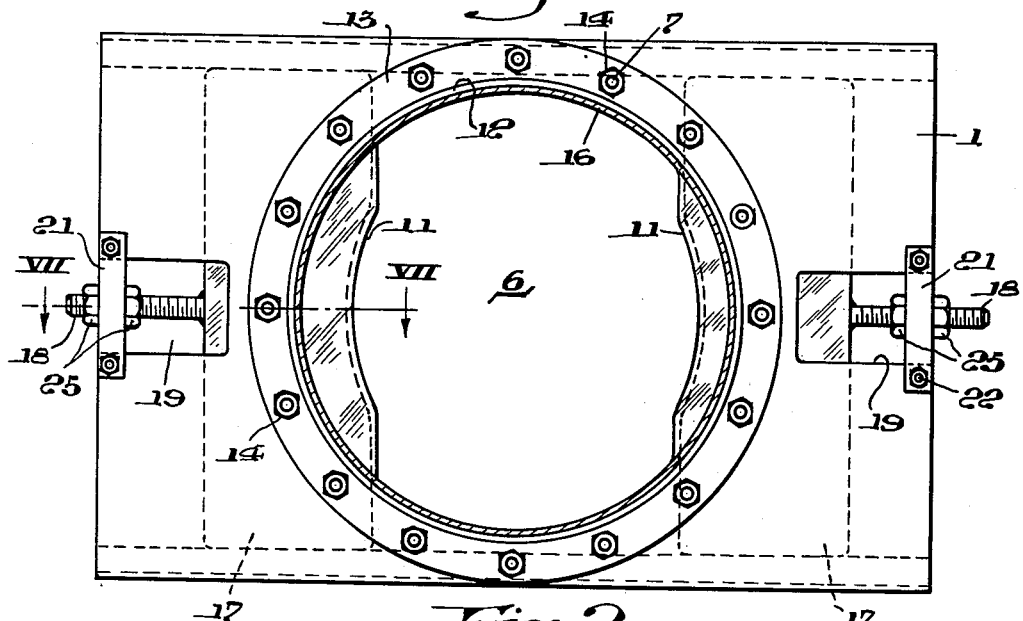
Figure 7:
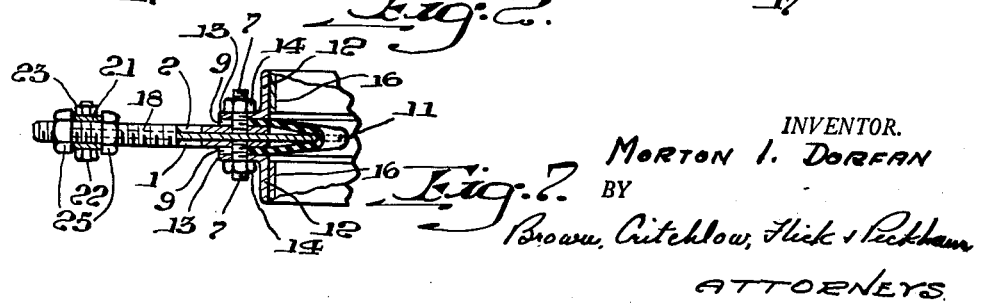

The preferred embodiment of the invention is illustrated in the accompanying drawings, in which Fig. 1 is a side view of the valve when it is wide open;
Fig. 2 is a similar view showing the valve partly closed;
Fig. 3 is an enlarged fragmentary end view of a detail of the valve;
Fig. 4 is a cross section taken on the line IV—IV of Fig. 1;
Fig. 5 is an enlarged detail of Fig. 4;
Fig. 6 is a longitudinal section of the valve taken on the line VI—VI of Fig. 4; and
Fig. 7 is a fragmentary section taken on the line VII—VII of Fig. 2.

Referring to the drawings, a pair of rectangular metal plates 1 and 2 are spaced apart a short distance by a pair of parallel spacing bars 3 extending lengthwise of the plates near their edges. A groove is formed between the plates along the outer edge of each bar, and a weld 4 is deposited in this groove to weld the plates and bars together. The central portions of the plates are provided with large aligned holes that form an opening 6 in the frame, this opening being the fluid passage of the valve. At regular intervals around the opening each plate is provided with small holes, in which the inner ends of threaded studs 7 are welded. These studs extend out through openings 8 in the parallel radial flanges 9 of a U-shape ring in the frame opening. The annular portion 11 of the ring connecting its flanges extends through the frame and forms a liner for the valve opening. The ring is formed from resilient material, such as abrasion resistant rubber or the like. To facilitate applying the ring to the studs, it is preferred to make its flange openings 8 in the form of radial slots having open outer ends that can be slipped across the studs as shown in Fig. 6.

The resilient ring is clamped in place by means of metal angle rings, each of which has a cylindrical flange 12 encircled at one end by a radial flange 13. The radial flanges of the metal rings are provided with holes for receiving studs 7, so that these flanges can fit flat against the resilient ring flanges 9. Nuts 14 are screwed on the outer ends of the studs and are tightened against the angle rings to press them toward each other so that the flanges of the resilient ring will be clamped tightly between them and the frame plates. The pipes 16 that are to be connected by this valve are inserted in the angle rings and held therein in any suitable manner, such as by welding. It will be seen that the valve passage which connects these two pipes has a wall of rubber or the like which resists abrasion by abrasive particles in the gas flowing through the valve and which prevents the gas from escaping between the plates of the valve frame.

In order to throttle the valve passage the valve is formed so that one or more portions of the resilient ring can be stretched part way across opening 6 to reduce its size. This is accomplished by placing a gate between the frame plates 1 and 2 at one side of the valve opening, and preferably a similar gate at the opposite side of the opening. Each gate is a thin metal plate 17 that is substantially as thick as the spacing bars and that has its ends slidably engaging them. Projecting from the center of the outer edge of the gate there is a stud 18 that extends outward beyond the adjacent end of the frame. The opposite ends of the frame plates are provided with recesses 19 to accommodate the studs, and short bars 21 are secured to the outer surfaces of the plates at the outer end of each recess, preferably by bolts 22 extending through the bars and plates. Nuts 23 are screwed onto the bolts, and spacing washers 24 are mounted on the bolts between the plates as shown in Fig. 3. The adjacent stud 18 extends between the bars and has nuts 25 threaded on it at opposite edges of the bars. By turning these nuts on a stud in the same direction, the stud can be moved outward or inward toward the center of the valve opening and locked in any desired position.

In its outermost position, as shown in Fig. 6, each gate preferably has its inner edge engaging or nearly engaging the annular portion 11 of the resilient ring. If desired, the inner edge of the gate may have a concave area conforming to the curvature of the ring. When a gate is moved inward toward the center of the valve passage it pushes the adjoining portion of the resilient ring inward and stretches it a corresponding amount as shown in Figs. 2 and 7. This deforms the shape of the valve passage and reduces its size. Either gate can be moved inward in this manner without the other, both gates can be moved toward each other the same distance, or one gate can be moved in farther than the other as shown. The way in which the gates are manipulated will depend on how much throttling is desired and also on whether it is desired to direct the flowing gas toward one side or the other of the fluid passage. When a gate is moved inward so that it stretches a portion of the resilient ring, the stretched portion will converge from the angle rings toward the inner edge of the gate as shown in Fig. 7. This convergence gives a streamlined effect to the valve.

This throttling valve is especially suitable for exhaust systems where the fine adjustment that can be accomplished with it can be used for maintaining desired fixed pressures. Such pressures can be calculated in advance to only within approximately 5 or 10%. The valve then permits the correct pressure to be obtained. This is important because the kinetic effects resulting from changing the velocity of the gas vary as the square of the velocity.

Consequently, it is extremely important to control the velocity closely, which can be done with this valve.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A throttling valve comprising a pair of frame plates provided with axially aligned holes forming a fluid passage therethrough, means spacing the plates apart, a gate at one side of said passage in the space between the plates, the gate being confined by the plates, a resilient ring in said passage U-shape in cross section having spaced radial flanges engaging the outer surfaces of said plates around said holes, means sealing said flanges against the plates, and means to slide the gate inward to stretch the ring part way across said passage.

2. A throttling valve comprising a pair of frame plates provided with axially aligned holes forming a fluid passage therethrough, a pair of parallel spacing members between the plates at opposite sides of said passage, a gate between the plates at one side of said passage and slidable along said members, a resilient ring in said passage U-shape in cross section having spaced radial flanges engaging the outer surfaces of said plates around said holes, angle rings at opposite ends of said passage and concentric therewith adapted to be connected to a pair of spaced pipes, each of the angle rings having a radial flange fitting against the adjoining flange of the resilient ring, means pressing said angle rings toward each other to clamp said resilient flanges against said plates, and means to slide the gate inward to stretch the resilient ring part way across said passage.

3. A throttling valve comprising a pair of frame plates provided with axially aligned holes forming a fluid passage therethrough, a pair of parallel spacing members between the plates at opposite sides of said passage, a gate between the plates at one side of said passage and slidable along said members, a resilient ring in said passage U-shape in cross section having spaced radial flanges engaging the outer surfaces of said plates around said holes, angle rings at opposite ends of said passage and concentric therewith adapted to be connected to a pair of spaced pipes, each of the angle rings having a radial flange fitting against the adjoining flange of the resilient ring, studs projecting from said plates through said resilient flanges and angle ring flanges, nuts screwed onto the studs for clamping the resilient flanges against said plates, and means to slide the gate inward to stretch the resilient ring part way across said passage.

4. A throttling gate valve comprising a frame provided with an opening forming a fluid passage therethrough, the frame having a pair of diametrically opposite radial slots adjoining said passage, a pair of gates in said slots slidingly engaging their side walls, means for independently moving the gates radially of said opening toward its center, and a resilient U-shape ring secured to the frame around the opening and extending across the inner edges of the gates, the portion of the ring beside the gates being adapted to be stretched by them inward part way across said opening when they are moved inward, whereby to reduce the size of said passage.

References Cited in the file of this patent

UNITED STATES PATENTS

| | | |
|---|---|---|
| 1,238,521 | Janish | Aug. 28, 1917 |
| 1,740,004 | Crowley | Dec. 17, 1929 |
| 1,838,656 | Bullock | Dec. 29, 1931 |
| 2,029,151 | Bigelow | Jan. 28, 1936 |
| 2,396,544 | Voyle | Mar. 12, 1946 |
| 2,434,835 | Colley | Jan. 20, 1948 |